United States Patent
Li et al.

(10) Patent No.: US 9,477,507 B2
(45) Date of Patent: Oct. 25, 2016

(54) STATE CUSTOMIZATION OF FORKED VIRTUAL MACHINES

(71) Applicant: VMware, Inc., Palo Alto, CA (US)

(72) Inventors: Hui Li, Fremont, CA (US); Gabriel Tarasuk-Levin, Sunnyvale, CA (US); Jayanth Gummaraju, San Francisco, CA (US); Daniel James Beveridge, Apollo Beach, FL (US)

(73) Assignee: VMware, Inc., Palo Alto, CA (US)

( * ) Notice: Subject to any disclaimer, the term of this patent is extended or adjusted under 35 U.S.C. 154(b) by 158 days.

(21) Appl. No.: 14/136,741

(22) Filed: Dec. 20, 2013

(65) Prior Publication Data

US 2015/0178110 A1 Jun. 25, 2015

(51) Int. Cl.
G06F 9/455 (2006.01)
(52) U.S. Cl.
CPC . *G06F 9/45558* (2013.01); *G06F 2009/45562* (2013.01)
(58) Field of Classification Search
None
See application file for complete search history.

(56) References Cited

U.S. PATENT DOCUMENTS

| | | | |
|---|---|---|---|
| 6,795,966 B1 | 9/2004 | Lim et al. | |
| 7,484,208 B1 | 1/2009 | Nelson | |
| 7,680,919 B2 | 3/2010 | Nelson | |
| 7,725,531 B1* | 5/2010 | Sood | G06F 15/173 709/203 |
| 8,151,263 B1 | 4/2012 | Venkitachalam et al. | |
| 8,239,633 B2 | 8/2012 | Wood | |
| 8,285,808 B1 | 10/2012 | Joel et al. | |
| 8,307,187 B2 | 11/2012 | Chawla et al. | |
| 8,499,191 B2 | 7/2013 | Shimada | |
| 8,555,274 B1 | 10/2013 | Chawla | |
| 8,631,066 B2 | 1/2014 | Lim | |
| 8,793,427 B2 | 7/2014 | Lim et al. | |
| 8,904,081 B1 | 12/2014 | Kulkarni | |
| 9,081,686 B2 | 7/2015 | Beveridge et al. | |
| 2004/0010787 A1 | 1/2004 | Traut et al. | |
| 2006/0101189 A1 | 5/2006 | Chandrasekaran et al. | |
| 2006/0129627 A1 | 6/2006 | Phillips et al. | |
| 2006/0227585 A1 | 10/2006 | Tomoda | |
| 2007/0074208 A1 | 3/2007 | Ling et al. | |
| 2007/0204121 A1 | 8/2007 | O'Connor et al. | |

(Continued)

FOREIGN PATENT DOCUMENTS

GB 2483300 3/2012

OTHER PUBLICATIONS

USPTO, "Non-final Office Action in U.S. Appl. No. 14/136,701", Mailed Date Jun. 18, 2015, 10 pages.

(Continued)

*Primary Examiner* — Eric C Wai

(57) ABSTRACT

Embodiments support instant forking of virtual machines (VMs) and state customization. A computing device initiates execution of a first group of services (e.g., identity-independent) in a first VM. A second VM is instantiated from the first VM. The second VM shares memory and storage with the first VM. The computing device customizes the second VM based on configuration data associated with the second VM. A second group of services (e.g., identity-dependent) starts executing on the second VM after configuring the identity of the second VM. Customizing the second VM includes configuring one or more identities of the second VM. In some embodiments, a domain identity is selected from a pool of previously-created identities and applied to the second VM, before bootup completes on the second VM.

20 Claims, 11 Drawing Sheets

(56) References Cited

U.S. PATENT DOCUMENTS

| | | |
|---|---|---|
| 2008/0134177 A1 | 6/2008 | Fitzgerald et al. |
| 2008/0155223 A1 | 6/2008 | Hiltgen et al. |
| 2008/0244028 A1 | 10/2008 | Le et al. |
| 2009/0007106 A1 | 1/2009 | Araujo, Jr. |
| 2009/0113109 A1 | 4/2009 | Nelson |
| 2009/0282404 A1 | 11/2009 | Khandekar |
| 2010/0023942 A1 | 1/2010 | Sheu et al. |
| 2010/0070978 A1 | 3/2010 | Chawla et al. |
| 2010/0186011 A1 | 7/2010 | Magenheimer |
| 2011/0154331 A1 | 6/2011 | Ciano et al. |
| 2012/0066679 A1 | 3/2012 | Pappas et al. |
| 2012/0144391 A1 | 6/2012 | Ueda |
| 2012/0151477 A1 | 6/2012 | Sinha |
| 2012/0174096 A1 | 7/2012 | Conover |
| 2012/0204060 A1 | 8/2012 | Swift |
| 2012/0272236 A1 | 10/2012 | Baron et al. |
| 2013/0047160 A1 | 2/2013 | Conover |
| 2013/0067289 A1 | 3/2013 | Maislos et al. |
| 2013/0097377 A1 | 4/2013 | Satoyama |
| 2013/0111474 A1 | 5/2013 | Agarwal et al. |
| 2013/0198745 A1 | 8/2013 | De et al. |
| 2013/0246355 A1 | 9/2013 | Nelson |
| 2013/0332610 A1 | 12/2013 | Beveridge |
| 2013/0332920 A1 | 12/2013 | Laor |
| 2014/0047193 A1 | 2/2014 | Gross et al. |
| 2014/0068181 A1 | 3/2014 | Mridha et al. |
| 2014/0075127 A1 | 3/2014 | Garthwaite |
| 2014/0115228 A1 | 4/2014 | Zhou et al. |
| 2014/0156910 A1 | 6/2014 | Uttamchandani et al. |
| 2014/0164723 A1 | 6/2014 | Garthwaite et al. |
| 2014/0173181 A1 | 6/2014 | Beveridge et al. |
| 2014/0173196 A1 | 6/2014 | Beveridge |
| 2014/0173213 A1 | 6/2014 | Beveridge |
| 2014/0244950 A1 | 8/2014 | Baron et al. |
| 2014/0245294 A1 | 8/2014 | Kaul |
| 2014/0366019 A1 | 12/2014 | Bajaj |
| 2015/0089496 A1 | 3/2015 | Thankappan |
| 2015/0178108 A1 | 6/2015 | Tarasuk-Levin |
| 2015/0178110 A1 | 6/2015 | Li et al. |

OTHER PUBLICATIONS

Unknown, "Project Serengeti", accessed at <www.projectserengeti.org>>, accessed on Dec. 19, 2013, 2 pages.
Unknown, "Welcome to Apache Hadoop!", accessed at <<hadoop.apache.org>>, Dec. 12, 2013, 4 pages.
Unknown, "Horizon View", accessed at <www.vmware.com/products/horizon-view>>, accessed on Dec. 19, 2013, 6 pages.
Unknown, "Cloud Foundry Community", accessed at <<www.cloudfoundry.org>>, accessed on Dec. 19, 2013, 2 pages.
Lagar-Cavilla et al., "SnowFlock: Virtual Machine Cloning as a First Class Cloud Primitive", ACM Transactions on Computing Systems, vol. 29(1), Feb. 2011, 50 pages.
Unknown, "What's new in private Paas? Introducing OpenShift Enterprise 2.0", accessed at <www.redhat.com/about/events-webinars/webinars/2013-12-17-openshift-enterprise-2>>, accessed on Dec. 19, 2013, 1 page.
Unknown, "OpenShift Platform Features", Benefits Document, Red Hat, Inc., 2012, 5 pages.

Unknown, "SnowFlock: Swift VM Cloning for Cloud Computing", accessed at </sysweb.cs.toronto.edu/snowflock>>, accessed on Dec. 19, 2013, 2 pages.
Unknown, "Virtual Memory Streaming", OpenStack, Gridcentric, Inc., 2013, 2 pages.
Unknown, "RemoteApp for Hyper-V", Remote Desktop Services Blog, accessed at <<blog.msdn.com/b/rds/archive/2009/12/15/remoteapp-for-hyper-v.aspx>>, Dec. 2009, 5 pages.
Unknown, "LXC", accessed at <en.wikipedia.org/wiki/LXC>>, accessed on Dec. 19, 2013, 2 pages.
Unknown, "Linux-VServer", accessed at <<en.wikipedia.org/wiki/Linux-VServer>>, accessed on Dec. 19, 2013, 3 pages.
"Notice of Allowance and Fees Due", U.S. Appl. No. 14/136,701, mailed Dec. 18, 2015, 13 pages.
"Non-Final Office Action" U.S. Appl. No. 14/615,366, mailed Nov. 20, 2015, 10 pages.
Wang et al., "Rethink the Virtual Machine Template", published 2011.
Vrable, M. et al. "Scalability, fidelity, and containment in the Potemkin virtual honeyfarm", ACM SIGOPS Operating Systems Review, Published Oct. 20, 2005, Retrieved from the Internet: URL: portal.acm.org/citation.cfm?id=I095825>, 15 pages.
Shi et al., "A Cloud Service Cache System Based on Memory Template of Virtual Machine", published 2011.
Bryant et al., "Kaleidoscope: Cloud Micro-Elasticity via VM State Coloring", published 2011.
"Non-Final Office Action", U.S. Appl. No. 14/136,661, mailed Mar. 3, 2016, 2 pages.
"International Search Report and Written Opinion", International Patent Application No. PCT/US2015/046177, mailed Oct. 30, 2015, 11 pages.
Liu, H. et al. Live Virtual Machine 1-20 Migration via Asynchronous Replication and State Synchronization, IEEE Transactions on Parallel and Distributed Systems, vol. 22, No. 12, Los Alamitos, CA, Published Dec. 1, 2011, 14 pages.
"International Search Report and Written Opinion", International Patent Application No. PCT/US2015/046178, mailed Oct. 26, 2015, 11 pages.
Unknown, "Atlantis ILIO in XenApp Environments, 1-20 1", Published Apr. 2014. Retrieved on Oct. 15, 2015, Retrieved from the Internet: URL:web.archive.org/web/20 14070 1144808/ http://atlantiscomputing.com/downloads/WP Atl antisiL-lOinXenApp Environnnents20140424.pdf >, 2 pages.
Unknown, "Atlantis ILIO Diskless VDI for VMware View", Published Jan. 24, 2014, Retrieved Oct. 15, 2015, Retrieved from the Internet: URL:web.archive.org/web/20140124082015/www.atlantisconnputing.com/downloads/DisklessVDl Solution BriefVMWare.pdf>, 2 pages.
"Non-Final Office Action", U.S. Appl. No. 13/764,405, mailed Mar. 26, 2015, 23 pages.
"Non-Final Office Action", U.S. Appl. No. 13/764,516, mailed Mar. 27, 2015, 21 pages.
Beveridge et al., "Rapid Suspend/Resume for Virtual Machines Via Resource Sharing", U.S. Appl. No. 14/615,353, filed Feb. 5, 2015, 44 pages.
USPTO, "Notice of Allowance and Fees Due in U.S Appl. No. 14/136,701", Mailed Date: Dec. 18, 2015, 13 pages.
USPTO, Non-final Office Action in U.S. Appl. No. 14/615,366, Mailed Date: Nov. 20, 2015, 10 pages.
Mills, Paul V., Office Action, U.S. Appl. No. 14/136,661, mailed Jun. 16, 2016, 17 pages.

* cited by examiner

STATE CUSTOMIZATION OF FORKED VIRTUAL MACHINES

CROSS-REFERENCE TO RELATED APPLICATIONS

This application is related to U.S. application Ser. No. 14/136,621 entitled "Elastic Compute Fabric Using Virtual Machine Templates," U.S. application Ser. No. 14/136,661 entitled "Fast Instantiation of Virtual Machines," and U.S. application Ser. No. 14/136,701 entitled "Provisioning Customized Virtual Machines Without Rebooting," filed concurrently herewith, all of which are incorporated by reference herein in their entireties.

BACKGROUND

Some cloud services require many virtual machines (VMs) to efficiently support multiple tenants and/or multiple concurrent jobs. Examples include cloud services that manage very large datasets such as vHadoop from VMware, Inc., virtual desktop services such as Virtual Desktop Infrastructure (VDI) from VMware, Inc., and cloud service providers such as the CLOUD FOUNDRY brand computer services (e.g., MONGODB brand computer software). Each of these services, and others, requires a large pool of VMs to be created and scaled-back over time and on demand, dependent on the workload of the service. Further, the services require VM instantiation and teardown operations to be fast and highly elastic.

However, the existing operations for VM instantiation and teardown are slow and highly processor intensive. For example, it may take 20 seconds to boot one of the VMs using some existing systems. Some existing systems rely on linked clones for VM instantiation. While some linked VM clones use small delta disks that reference a larger base disk of another VM, these systems lack a mechanism for online customization of the instantiated VMs (e.g., performed while the VMs are powered-on). For example, as linked VM clone functionality does not inherently include customization, some of the existing systems rely on offline domain join techniques (e.g., performed while the VMs are powered-off). As another example, these systems are unable to configure instantiated VMs with different states. Further, many guest operating systems require rebooting, or other operations with a high time cost, to set identities within the instantiated VMs due to restrictions at the operating system level.

SUMMARY

One or more embodiments described herein create and customize forked virtual machines (VMs). A computing device initiates execution of a first group of services in a first virtual machine (VM). A second VM is instantiated from the first VM. The second VM shares memory and storage with the first VM. The computing device configures an identity of the second VM based on configuration data associated with the second VM. A second group of services starts executing on the second VM after configuring the identity of the second VM.

In some embodiments, configuring the identity of the second VM includes obtaining and applying one of a plurality of available domain identities available to the second VM before bootup completes on the second VM.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
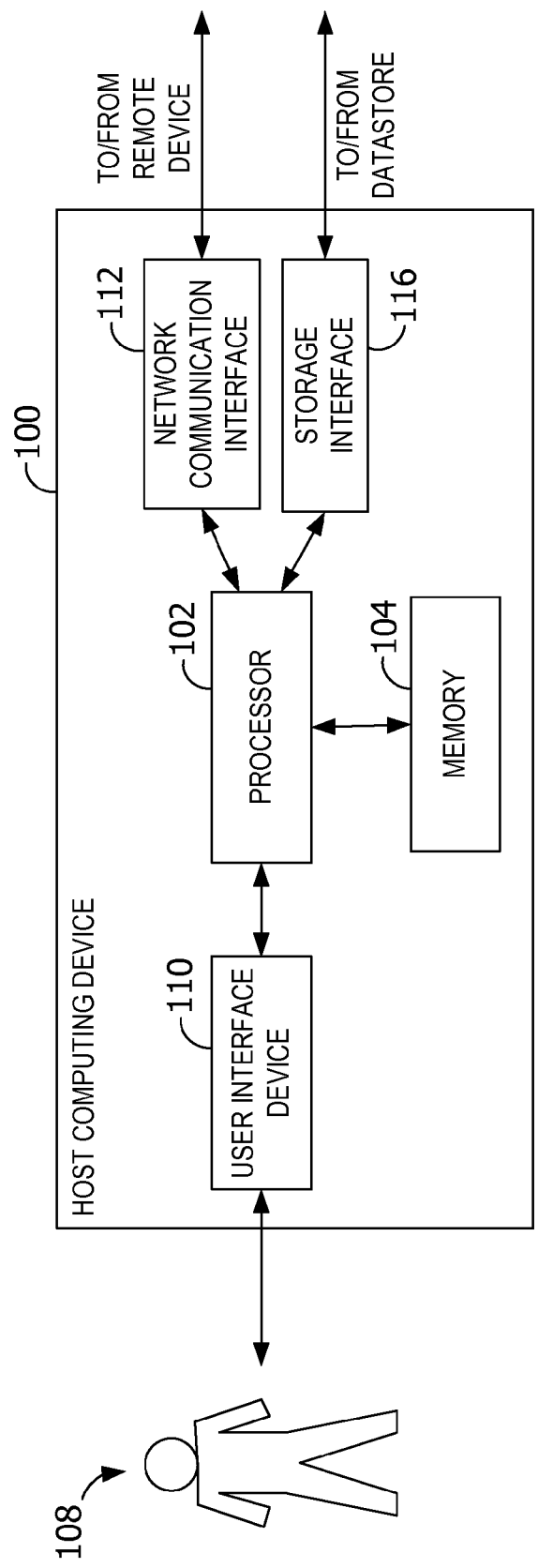
FIG. 1 is a block diagram of an exemplary host computing device.

Embodiments herein instantly fork and configure live child virtual machines (VMs) from a powered on parent VM with underlying memory and disk resource (e.g., storage) sharing. Services for execution on the child VMs are differentiated based on whether the services rely on an identity of the child VMs when executed. A first group of services (e.g., generally identity-independent) is configured to execute in the parent VM prior to forking of the child VMs. After forking and customization of the child VMs (e.g., identity configuration), a second group of services (e.g., generally identity-dependent) is configured to execute in the child VMs. Execution of the second group of services occurs without prompting or provoking a reboot of the child VMs. In this manner, aspects of the disclosure provide reboot-free identity customization, despite some guest operating systems in the child VMs being programmed to reboot upon observing identity changes.

In some embodiments, forking includes implementing copy-on-write (COW) memory sharing with the parent VM, as well as COW storage (e.g., disk) sharing with the parent VM. Further, customizing the child VMs includes selecting a domain identity from a pool of previously-created identities and applying the selected identity to the child VM before bootup completes on the child VM.

In some embodiments, a script is executed to customize a state of each new forked VM to produce a child VM with a different state than the parent VM. For example, based on a virtual device state 318 of a suspended parent VM (e.g., a first VM), a virtual device state of the child VM (e.g., a second VM) is defined. Persistent storage of the child VM is also defined based on persistent storage of the parent VM. A memory state of the child VM is also defined based on a memory state of the parent VM.

Embodiments further configure a state of each newly-instantiated child VM based on configuration data 313 for the child VM, including configuring one or more identities on the fork path. The identities are configured without involving a reboot of the child VM, despite any guest operating system level restrictions requiring reboot operations when configuring identities. Rebooting the child VM would defy the memory page sharing achieved by the forking operations described herein at least because the memory page sharing would be lost with the reboot. In this manner, aspects of the disclosure are operable to "instantly" provision child VMs. Further, eliminating reboot operations reduces overall provisioning time, which reduces overall cost of ownership for users. The level of boot storm is also significantly reduced when customizing large quantities of child VMs, thus reducing input/output commands per second (IOPS) at the storage array level. Reducing IOPS reduces storage cost for users.

An exemplary identity set includes, but is not limited to, one or more of the following items: computer name, domain machine account with domain join, license client machine identifier with key management service (KMS) volume license activation, media access control (MAC) address, and/or Internet Protocol (IP) address. For example, a domain identity is selected, at fork time, from a pool of previously-created (e.g., pre-configured) domain identities. The selected domain identity is applied to the child VM in a way that does not confuse existing processes in the child VM. For example, some embodiments prevent boot completion of the child VM until customization has finished.

In some embodiments, the forking and identity configuration operations are implemented as part of a shared compute fabric cloud service 402 that efficiently supports fast, elastic, and automatic provisioning of VMs for multiple cloud services 302 (e.g., tenants of compute fabric cloud service 402). Some embodiments of compute fabric cloud service 402 present an application programming interface (API) 404 that may be leveraged by many of cloud services 302 to quickly scale in and scale out of VMs, such as VMs 235, based on demand. In operation, cloud services 302 request resources and properties of the resources, and compute fabric cloud service 402 makes the resources available immediately, instantaneously, or otherwise faster than existing systems.

Aspects of the disclosure include a shared infrastructure (e.g., compute fabric cloud service 402) accessible via API 404 that enables quick provisioning of VMs 235 by managing a hierarchy of powered-on templates and employing fast VM instantiation operations 406 (e.g., forking operations such as shown in FIG. 5A, FIG. 5B, FIG. 5C, and FIG. 5D) to quickly spawn VMs 235 with desired properties. Some embodiments store parent VM templates 310 in a tree hierarchy with each parent VM template 310 representing a linked clone of its parent with its memory shared via copy-on-write (COW). In some of these embodiments, a set of child VMs, pre-registered to a cloud operating system, is internally maintained for each template. The child VMs are created as a linked clone of the corresponding parent VM template 310. When one of cloud services 302 commissions or otherwise requests provisioning of one or more VMs 235, aspects of the disclosure create a COW share of parent VM template 310 memory to give to requesting cloud service 302.

In this manner, and as described further herein, compute fabric cloud service 402 supports the instantaneous provisioning of VMs 235 on demand, allows for memory and disk content sharing across cloud services 302 using parent VM templates 310 common to cloud services 302, and improves cloud service 302 performance by eliminating use of hot spare VMs 235.

Embodiments are operable with any cloud service 302, such as those managing very large datasets (e.g., "big data"), those supporting virtual desktops, and those providing a cloud computing platform as a service or other cloud service provider (e.g., CLOUD FOUNDRY brand computer services). In part by creating and managing parent VM templates 310 as described herein and performing the forking routines, aspects of the disclosure are able to instantly provision (e.g., about under a second) these and other cloud services 302 with fully functional VMs 235 with low (e.g., minimal) processor overhead.

An exemplary virtualized environment is next described.

FIG. 1 is a block diagram of an exemplary host computing device 100. Host computing device 100 includes a processor 102 for executing instructions. In some embodiments, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid-state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
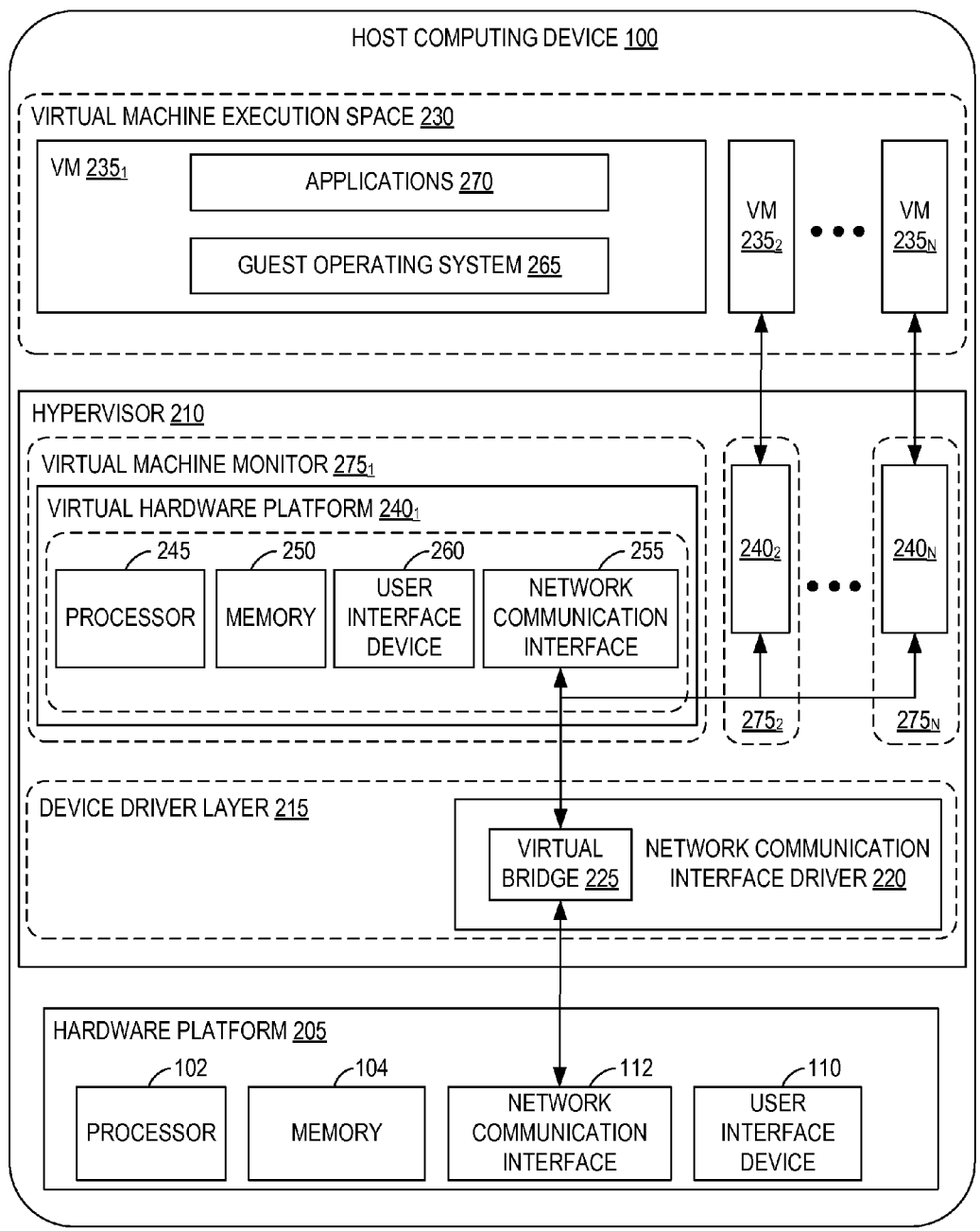
FIG. 2 is a block diagram of virtual machines (VMs) that are instantiated on a computing device, such as the host computing device shown in FIG. 1.

FIG. 2 depicts a block diagram of virtual machines $235_1$, $235_2 \ldots 235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some embodiments, memory 250 in first virtual hardware platform $240_1$ includes a virtual disk that is associated with or "mapped to" one or more virtual disk images stored on a disk (e.g., a hard disk or solid-state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such embodiments, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual MAC address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach VM 235 in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
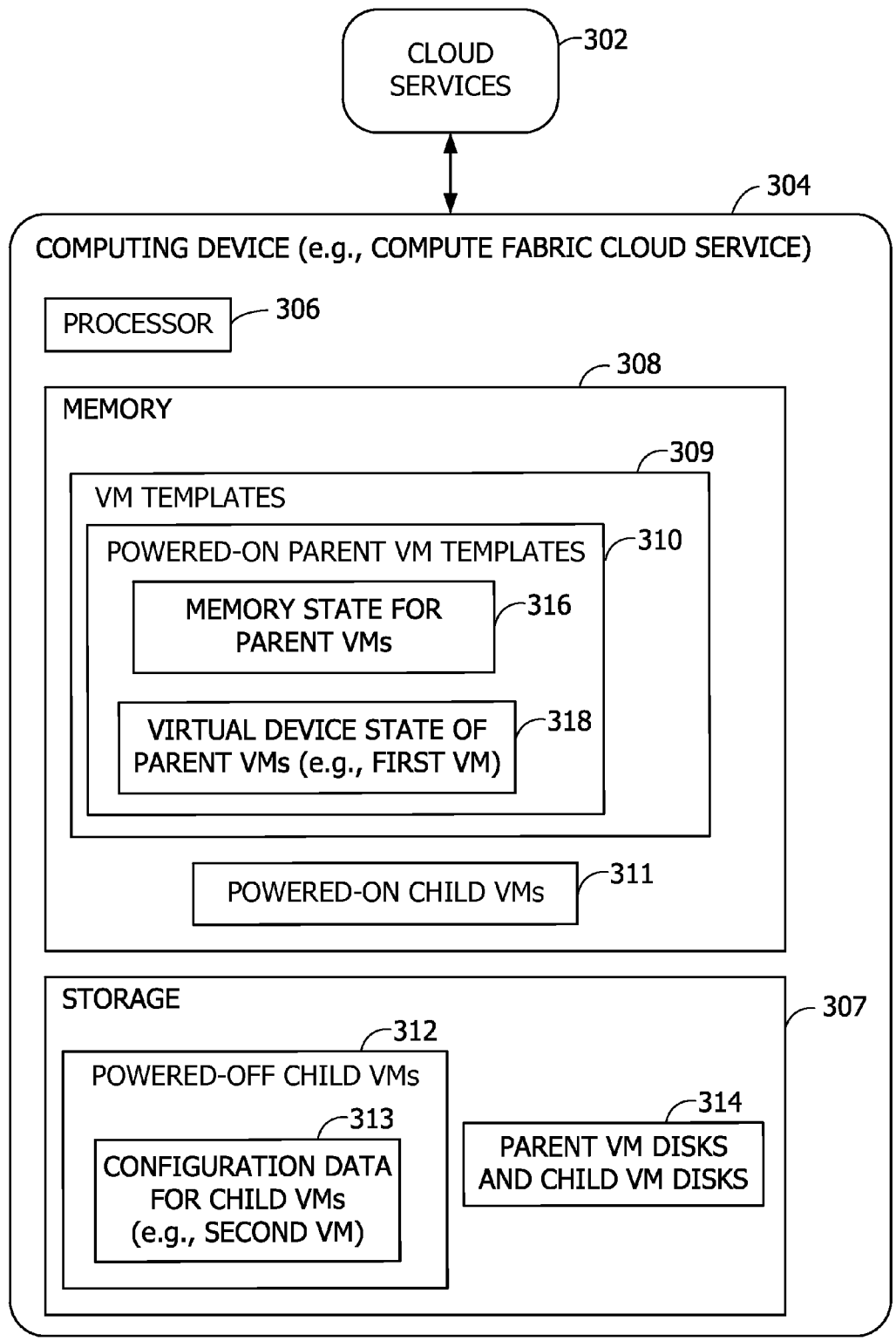
FIG. 3 is a block diagram of an exemplary computing device storing VM templates and data describing VMs instantiated therefrom.

Referring next to FIG. 3, a block diagram illustrates an exemplary computing device 304 storing a plurality of VM templates 309 and data describing VMs 235 instantiated therefrom, and communicating with at least one of cloud services 302. Computing device 304 represents any device executing instructions (e.g., as application programs, operating system functionality, or both) to implement the operations and functionality described herein. For example, computing device 304 executes instructions to implement the operations illustrated in FIG. 5A, FIG. 5B, FIG. 5C, and FIG. 5D. Computing device 304 may include any computing device or processing unit. In some embodiments, computing device 304 may represent a group of processing units or other computing devices, such as in a cloud computing configuration. For example, computing device 304 executes a plurality of VMs 235.

Computing device 304 has at least one processor 306 and a memory 308 (e.g., a memory area). Processor 306 includes any quantity of processing units, and is programmed to execute computer-executable instructions for implementing aspects of the disclosure. The instructions may be performed by processor 306 or by multiple processors executing within computing device 304, or performed by a processor external to computing device 304. In some embodiments, processor 306 is programmed to execute instructions such as those illustrated in the figures to implement compute fabric cloud service 402.

Memory 308 includes any quantity of computer-readable media associated with or accessible by computing device 304. Memory 308, or portions thereof, may be internal to computing device 304, external to computing device 304, or both. Exemplary memory 308 includes random access memory.

In the example of FIG. 3, memory 308 stores a plurality of VM templates 309. In some embodiments, VM templates 309 are arranged in a hierarchy, such as a tree hierarchy. However, aspects of the disclosure are operable with VM templates 309 stored in any structure. In such embodiments, VM templates 309 include a plurality of powered-on parent VM templates 310. The powered-on parent VM templates 310 may be created and maintained by compute fabric cloud service 402 and/or by cloud services 302. The parent VM templates 310 may be classified, categorized, or otherwise described as derived VM templates and standalone VM templates. Derived VM templates are derived from one of parent VM templates 310, and inherit one or more disk blocks (e.g., "common" disk blocks) from that corresponding parent VM template 310. The standalone VM templates lack any such inherited disk block from parent VM templates 310. Aspects of the disclosure are operable with any form of disk block inheritance, such as via a redo log, array-level snapshots (e.g., using block reference counting), etc.

In some embodiments, each parent VM template 310 includes a virtual device state 318 for one of VMs 235 and a memory state 316 for that VM 235. Memory 308 further stores data describing a plurality of powered-on child VMs 311.

Computing device 304 further includes storage 307. Storage 307 stores data describing a plurality of powered-off child VMs 312. Each of the powered-off child VMs 312 is instantiated, on demand, from one of the plurality of parent VM templates 310. Until then, powered-off child VMs 312 do not occupy any memory resources. For example, powered-off child VMs 312 are present in storage 307 and, when powered-on, copy-on-write (COW) share memory pages with parent VMs and enter into memory 308.

The child VMs have one or more properties, characteristics, or data associated therewith. Exemplary child VM properties include, but are not limited to, hostname, IP address, MAC address, domain identity, processor size, and/or memory size. In some embodiments, the child VM properties for each child VM (e.g., second VM) may be referred to as configuration data 313. Storage 307 further stores parent VM disks and child VM disks 314 (e.g., .vmdk files) for use by VMs 235.

In contrast to memory 308, exemplary storage 307 includes one or more disks.

After instantiation, powered-off child VMs 312 are registered to the cloud operating system. The cloud operating system is executed by compute fabric cloud service 402. Registration of one of powered-off child VMs 312 includes identifying powered-off child VM 312 to the cloud operating system, and occurs before powered-off child VM 312 is powered-on or otherwise executed. In this manner, powered-off child VM 312 is said to be pre-registered with the cloud operating system. In some embodiments, the cloud operating system is hypervisor 210. By registering powered-off child VMs 312, the cloud operating system is no longer in the critical path when cloud services 302 commission VMs 235, thus reducing the amount of time needed for child VMs to become available. However, aspects of the disclosure are also operable with registration occurring on the child VM instantiation path.

Figure 4:
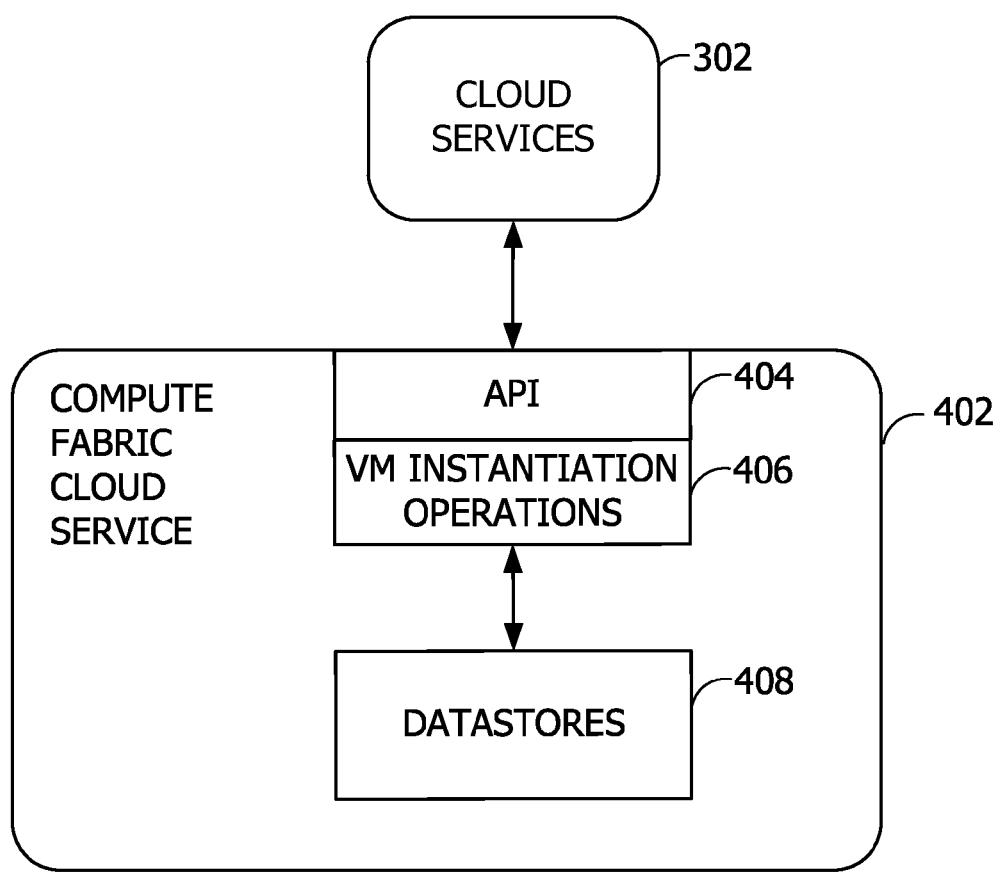
FIG. 4 is a block diagram of an exemplary compute fabric cloud service interacting with cloud services to deploy VMs.

Referring next to FIG. 4, a block diagram illustrates compute fabric cloud service 402 interacting with cloud services 302 to deploy VMs 235. In the example of FIG. 4, compute fabric cloud service 402 has API 404 accessible to cloud services 302. Cloud services 302 interact with compute fabric cloud service 402 via API 404. API 404 provides an interface to VM instantiation operations 406. Aspects of the disclosure are operable with any API for implementing the functionality described herein. An example of API 404 is described below in Table 1. However, those skilled in the art will note that additional or fewer function calls are contemplated, that additional or fewer arguments in each function call are contemplated, and that other means exist for implementing the functionality described herein and are within the scope of the disclosure.

The example of API 404 includes functions for execution during a setup phase, execution phase, and teardown phase while in a manual mode, and also supports a function call for auto mode. In manual mode, cloud service 302 is responsible for explicitly creating (and maintaining) parent VM templates 310. In automatic mode, one or more of parent VM templates 310 are created implicitly based on demand. For example, in manual mode, aspects of the disclosure derive the hierarchy of parent VM templates 310 by observing popular child VM configuration requests (e.g., based on a frequency of requests for those child VM configurations).

TABLE 1

Exemplary API Function Calls.

| | Manual Mode |
|---|---|
| Setup Phase | bool createParentTemplate(vmSpecs, packages, standaloneFlag, parentTemplate) |
| | bool createChildren(parentTemplate, childProperties, numChildren, childrenVMs) |
| Execution Phase | bool powerOnChildren(childrenVMs) |
| | bool powerOffChildren(childrenVMs) |
| | bool powerResetChildren(childrenVMs) |
| Teardown Phase | bool destroyParentTemplate(parentTemplate) |
| | bool destroyChildren(childrenVMs) |
| | Automatic Mode |
| | bool createChildrenAuto(vmSpecs, packages, maxLevels, childProperties, numChildren, childrenVMs) |

During the setup phase, cloud service 302 creates one of powered-on parent VM templates 310 using the createParentTemplate( ) function call. In addition to the VM 235 and package specifications, cloud service 302 also specifies whether to create a standalone template or a derived VM template (e.g., from another parent VM template 310). Cloud service 302 also creates a defined quantity of registered (e.g., to the cloud operating system) but powered-off child VMs 312 using the createChildren( ) function call. The createChildren( ) function call also takes as input a childProperties argument which defines, for example, the identities (e.g., hostname, IP/MAC address, etc.) and particular processor and/or memory sizes of the child VMs. If the sizes are different from that of parent VM template 310, compute fabric cloud service 402 may either add those resources when powering on the child VM (e.g., a "hot add") or create a new parent VM template 310. In addition, the childProperties argument also specifies how the created child VM behaves when powered-on and/or reset. For example, the child VM may act as an ephemeral entity that returns to the same, original parent state, or a regular VM that goes through a usual boot process.

In the execution phase, the child VMs are instantiated using the powerOnChildren( ) function call. The powerOnChildren( ) function call leverages fast VM instantiation techniques, such as those as described herein, to quickly spawn VMs 235 with minimal processor overhead. Child VMs 311 may also be powered off or reset using the powerOffChildren( ) function call and the powerResetChildren( ) function call.

In the teardown phase, parent VM templates 310 and child VMs 311 may be destroyed using the destroyParentTemplate( ) and destroyChildren( ) function calls. Depending on whether parent VM template 310 is part of the template hierarchy (e.g., a derived VM template) or a standalone template, destroying the template may not remove it completely from disk. The destroyChildren( ) function call turns off child VM 311 (e.g., power down) and resets the child VM properties such as identity, etc.

In automatic mode, rather than have parent VM templates 310 be explicitly created via the function calls available in manual mode, parent VM templates 310 are automatically generated based on demand. For example, cloud service 302 uses the createChildrenAuto( ) function call to create the child VMs. When a particular type of child VM is requested repeatedly (e.g., a plurality of requests are received for the same type of child VM), compute fabric cloud service 402 creates a new powered-on VM parent template, deriving it from the appropriate parent VM template 310 in the hierarchy. This optimization further simplifies the setup and teardown phases by eliminating the need for cloud services 302 to explicitly create, destroy, and otherwise manage parent VM templates 310. In some embodiments, the new parent VM template is created only if additional requests are expected for such VMs. For example, if the request for a particular VM is a one-off request, the new parent VM template is not created.

VM instantiation operations 406 are performed on VMs 235 stored in one or more datastores 408. Exemplary VM instantiation operations 406 include, but not limited to, cloning, copying, forking, and the like. VM instantiation operations 406 may be performed by virtualization products such as VMware's ESX brand software (e.g., in a kernel layer). In some embodiments, VM instantiation operations 406 implement fast-suspend-resume technology with COW page references (e.g., rather than handing over pages entirely). While described in some embodiments herein with reference to VM forking routines, those of ordinary skill in the art will note that the disclosure is not limited to these VM forking routines. Rather, the disclosure is operable with any fast VM instantiation routines.

Referring next to FIG. 5A, FIG. 5B, FIG. 5C, and FIG. 5D, flowcharts illustrate forking and configuring child VMs. While methods 500A, 500B, 500C, and 500D are described as being executed by computing device 304 in some embodiments, it is contemplated that methods 500A, 500B, 500C, and 500D may each be performed by any computing device. For example, methods 500A, 500B, 500C, and 500D may be executed by virtualization software including cloud service operating system and/or compute fabric cloud service 402.

Further, method 500B (e.g., preparing a parent VM) may be performed at any time prior to method 500C (e.g., forking the child VM). For example, preparing the parent VM may be triggered (e.g., execute a script) in response to an end user request (e.g., a request for the child VM from user 108). Method 500C may be performed on demand (e.g., in response to workload demands, triggered by user 108 via a user interface, by a management level application such as vHadoop, etc.). For example, operations 514, 516, and 518 may be performed in response to a request from a management level application executing on computing device 304. In some embodiments, method 500B has a higher time cost than method 500C. In such embodiments, because method 500B is performed in advance of method 500C, the time cost for forking the child VMs is less than if method 500B was performed as part of method 500C.

Figure 5A:
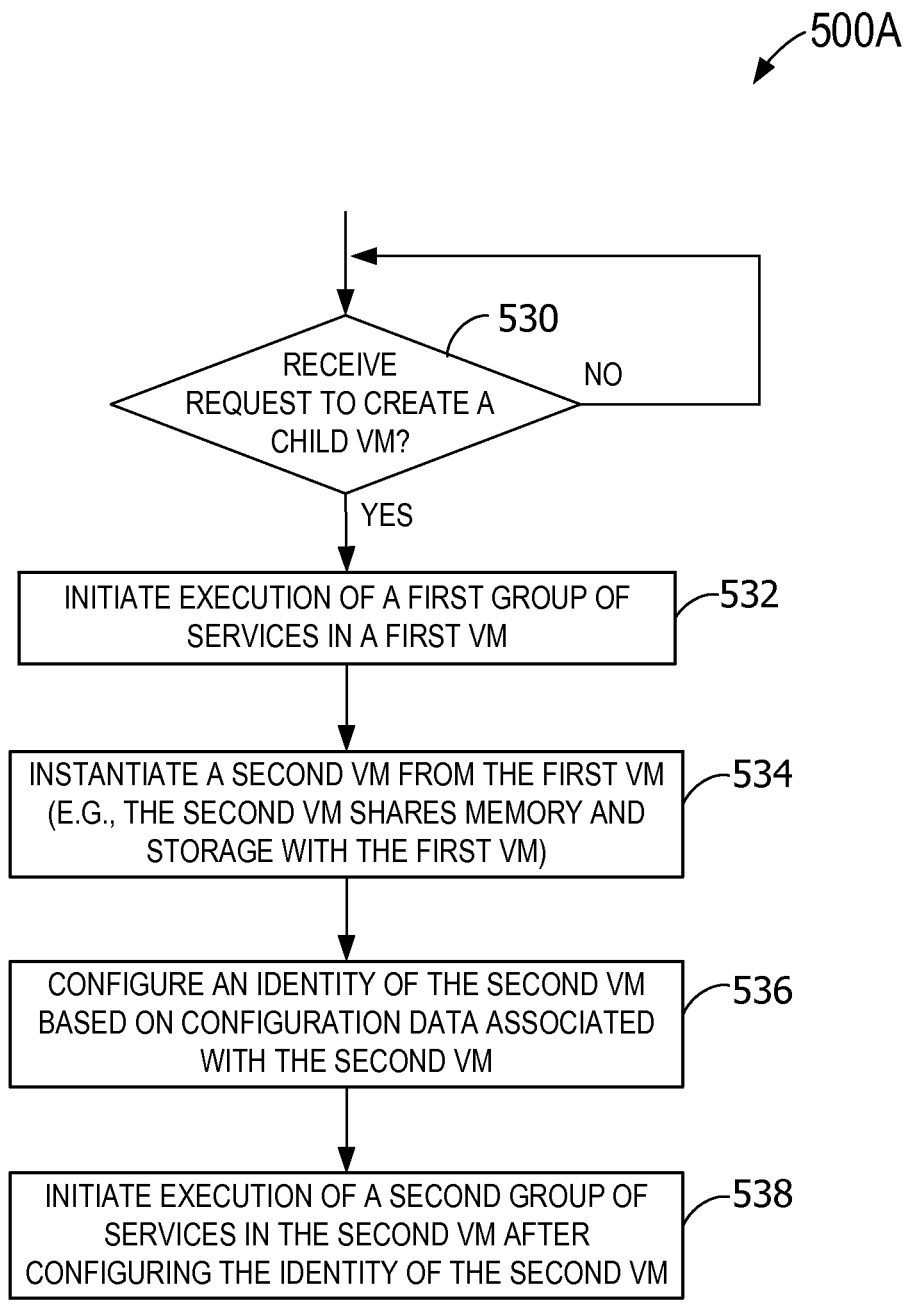
FIG. 5A is a flowchart of an exemplary method for the startup of services arranged according to dependence on identity.

Referring next to FIG. 5A, a flowchart illustrates the startup of services arranged according to dependence on identity. In general, aspects of the disclosure configure the boot process such that services not dependent on identity are started in the parent VM (e.g., before forking, before identity configuration on the child VMs), whereas services dependent on identity are started in each of the child VMs after configuring the identity of the child VM (e.g., during bootup). In some embodiments, some of the boot processes started in the parent VM may be re-started in the child VMs if those boot processes had some form of reliance or dependence on identity. Aspects of the disclosure further postpone the fork point as late as possible (e.g., start as many services in the parent VM as possible) to make instantiation of the child VMs as fast as possible.

Differentiation of the services may be performed by, for example, a service provider. In such an example, the service provider identifies the services that rely on identity.

If a request to create a child VM is received at 530, computing device 304 initiates execution of a first group of services in the parent VM (e.g., a first VM) at 532. The first group of services represents those services that are not dependent on identity. In some embodiments, the first group of services may also include services that have some dependence on identity. At 534, computing device 304 instantiates one of the child VMs (e.g., a second VM) from the parent VM. Instantiation includes, for example, forking the child VM from the parent VM, such as described herein. Each of the child VMs shares memory and storage with the first VM, in a copy-on-write (COW) manner. For example, the storage (e.g., disks 314) and memory state of the parent VM are each tagged as COW (e.g., to create COW sharing). In this manner, changes made by the child VMs to the read-only memory state of the parent VM are stored as delta memory.

At 536, computing device 304 configures an identity of the child VM based on configuration data 313. At 538, execution of a second group of services in the second VM is initiated after configuring the identity of the second VM. The second group of services represents those services that are dependent on identity. In this manner, the second group of services is able to rely on the configured identity when executing.

Figure 5B:
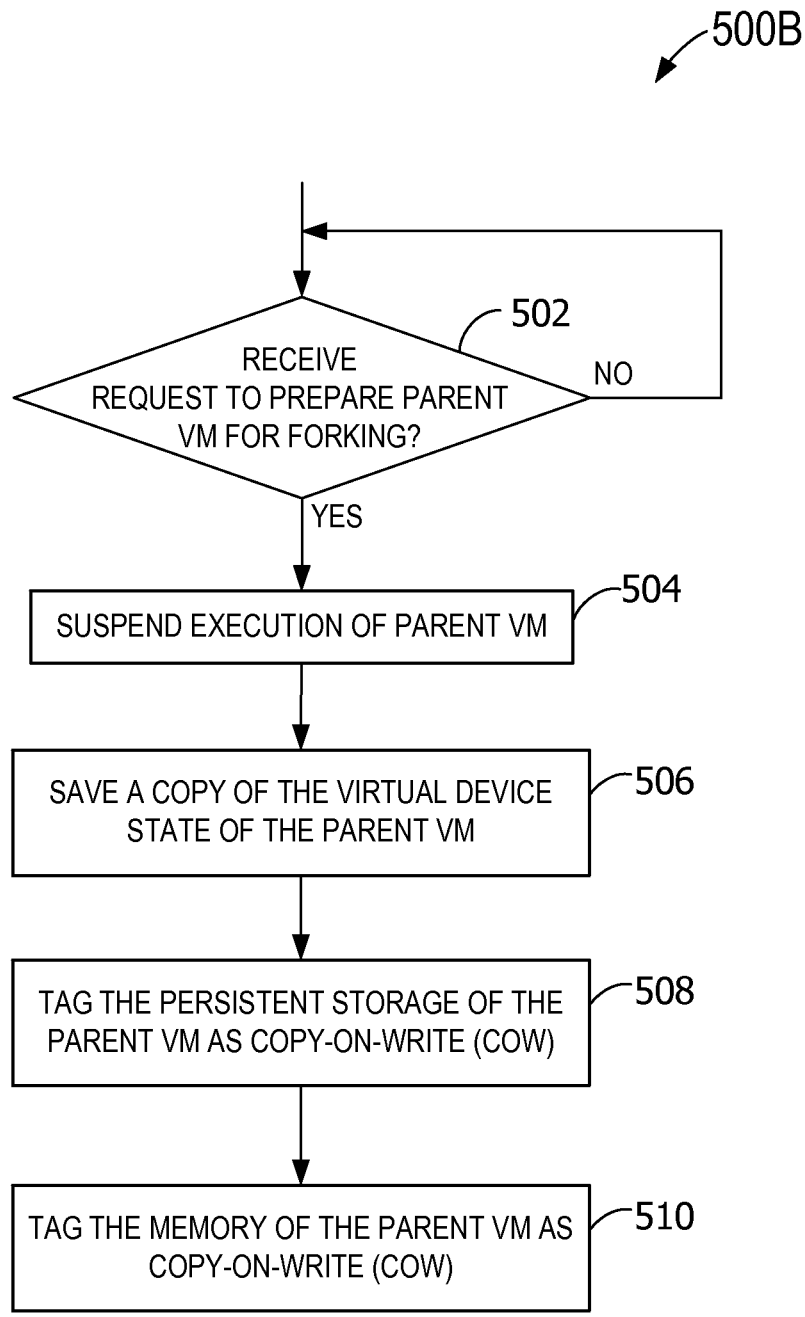
FIG. 5B is a flowchart of an exemplary method for preparing a parent VM for forking.

Referring next to FIG. 5B, a flowchart illustrates preparing a parent VM for forking. Upon receiving a request to prepare the parent VM for forking at 502, computing device 304 suspends execution of the parent VM at 504. Suspending the parent VM includes, for example, putting the running parent VM into a state where the parent VM may be forked at any time. Suspending the parent VM includes quiescing execution of the parent VM to enable state and data to be processed. In particular, a copy of virtual device state 318 of the parent VM is generated, obtained, created, and/or received and saved to memory 308 at 506. At 508, computing device 304 tags, marks, configures, or otherwise indicates that persistent storage of the parent VM is COW. At 510, computing device 304 tags, marks, configures, or otherwise indicates that memory of the parent VM is COW.

Figure 5C:
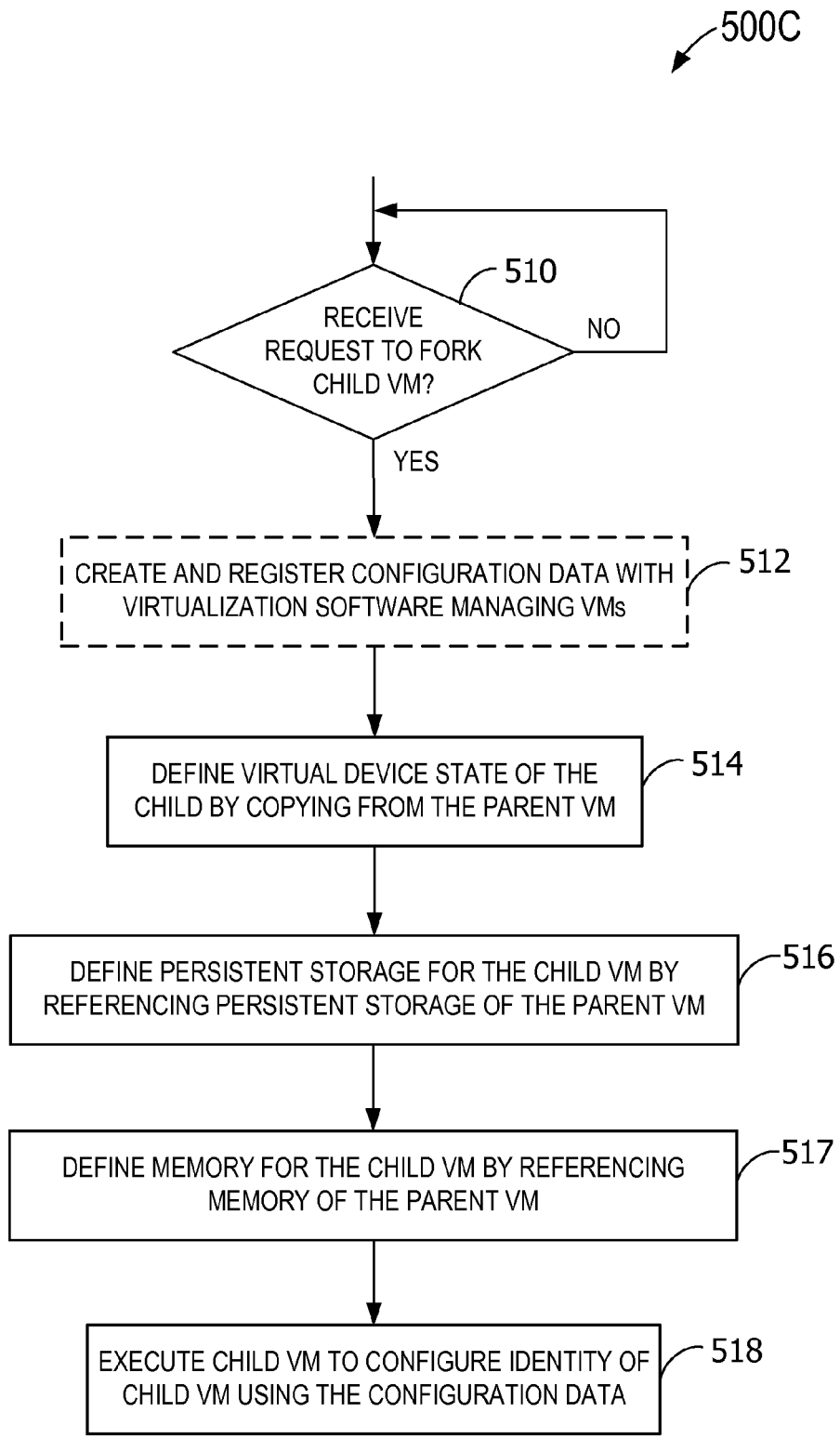
FIG. 5C is a flowchart of an exemplary method for configuring and deploying a child VM forked from the parent VM in FIG. 5B.

Referring next to FIG. 5C, a flowchart illustrates configuring and deploying the child VM forked from the parent VM. In some embodiments, configuration data 313 for the child VM is defined, created, received, and/or registered prior to receiving a request to fork the child VM (e.g., from a management level application). In other embodiments, such as in FIG. 5C, configuration data 313 is defined at 512 in response to receiving the request to fork the child VM at 510. Configuration data 313 may be defined from default values set by an administrator, received in the request from the management level application, and/or populated with data from other sources. Exemplary configuration data 313 for the child VM includes an IP address, a MAC address, a hostname, a domain identity, and/or any other state data to be applied when customizing the identity of the child VM. In some embodiments, configuration data 313 is stored in a file such as a .vmx file, with one file per child VM. Configuration data 313 may be registered with virtualization software, such as the cloud operating system.

At 514, computing device 304 defines a virtual device state of the child VM based on virtual device state 318 of the parent VM. For example, defining the virtual device state of the child VM includes copying virtual device state 318 from the parent VM.

At 516, computing device 304 defines, creates, receives, and/or registers persistent storage for the child VM based on persistent storage (.vmdk) of the parent VM. In some embodiments, persistent storage for the child VM is stored in a file, such as a .vmdk file. For example, defining the persistent storage for the child VM includes referencing persistent storage of the parent VM. In some embodiments, referencing persistent storage of the parent VM includes creating a read-only base disk referencing persistent storage of the parent VM, and creating a COW delta disk (associated with the child VM) to store changes made by the child VM to the base disk.

At 517, computing device 304 defines, creates, receives, and/or registers memory for the child VM based on memory of the parent VM. In some embodiments, referencing memory of the parent VM includes creating COW memory (associated with the child VM) to store changes made by the child VM to memory of the parent VM. In this manner, the child VM shares memory state of the parent VM with COW memory pages, in contrast with linked clones that use COW delta disks.

At 518, computing device 304 executes (e.g., powers on) the child VM, which becomes powered-on child VM 311. Execution of child VM 311 includes configuring an identity of child VM 311 using configuration data 313. In some embodiments, execution of child VM 311 includes configuration and execution of a boot process (or bootup process) to access and apply configuration data 313 to child VM 311. In this manner, child VM 311 customizes itself during bootup. The now-executing child VM 311 has a virtual device state that is a copy of virtual device state 318 of the parent VM, with persistent storage referencing persistent storage of the parent VM.

In some embodiments, the bootup process is executed by a guest operating system on child VM 311. The bootup process includes, for example, a command to perform a synchronous remote procedure call (RPC) to the cloud operating system to obtain and apply configuration data 313. An example format for the RPC is "rpc 'info-get'".

The forked child VM 311 may be configured in different ways, dependent in part on a type of guest operating system executing on child VM 311. One example for configuring an identity of child VM 311 is next described.

Figure 5D:
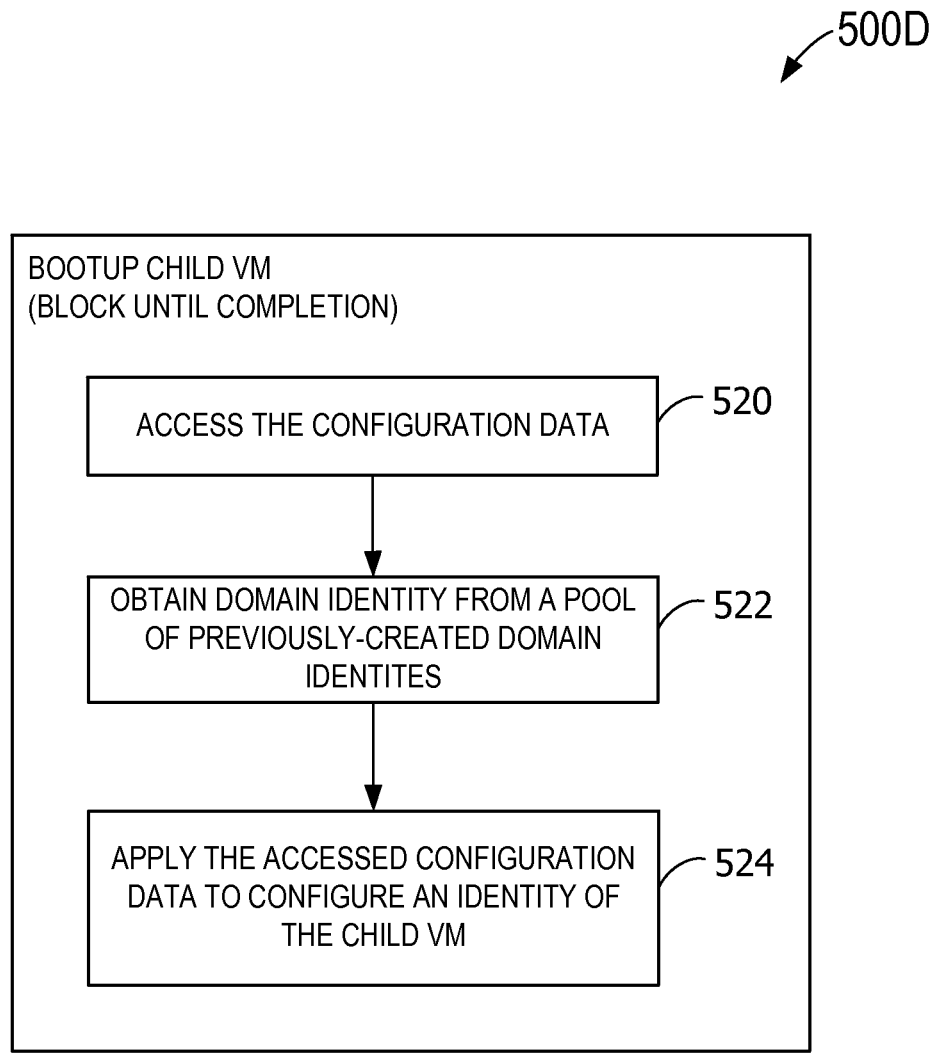
FIG. 5D is a flowchart of an exemplary method for configuring an identity of the forked child VM from FIG. 5C using a pool of domain identities.

Referring next to FIG. 5D, is a flowchart of an exemplary method for configuring an identity of the forked child VM from FIG. 5C using a pool of domain identities. Method 500D represents an example of a boot process applying customization to the child VM. The boot process includes a blocking agent that prevents the child VM from completing bootup until the operations illustrated in FIG. 5D have completed. For example, the blocking agent is injected into the boot process to prevent the guest operating system on the child VM from accepting user-level commands until the identity of the child VM has been configured.

At 520, the bootup process accesses configuration data 313 associated with the child VM. Configuration data 313 specifies a domain identity to be applied to the child VM. The domain identity is one of a plurality or pool of domain identities (e.g., previously-created, dynamically generated, etc.) available to the child VM. The plurality of domain identities are created, for example, by an administrator before the virtual device state of the child VM and the persistent storage of the parent VM are defined.

The domain identity may be pre-selected (e.g., explicitly identified in configuration data 313), or selected during execution of the bootup process (e.g., based on characteristics of executing child VM). The specified domain identity is obtained at 522 from the pool of previously-created identities. At 524, the obtained domain identity is applied to the child VM. In some embodiments, applying the obtained domain identity includes performing an offline domain join operation, or any method that allows a computer system to join a domain without a reboot.

In operation, preparing the parent VM may be performed, for example, by a guest agent residing inside a guest operating system of the parent VM. The guest agent issues a fork command to quiesce the parent VM into the ready-to-fork state at an appropriate boot stage of the parent VM. As provisioning operations are initiated, the one or more child VMs are forked without a committed identity. As the boot process continues inside each child VM, the various identities are applied to the child VMs. For example, due to the forking process as described herein, a copy of the guest agent from the parent VM appears in each child VM. The copy of the guest agent resumes execution inside each child VM as part of the boot process of the guest operating system. In this post-fork stage, for each child VM, the guest agent obtains (e.g., from a data store available to the guest operating system of the child VM) and applies one or more identities to the child VM. For example, the identities, or other parameters are stored as part of configuration data 313 in a .vmx file, or other file stored by the cloud operating system and accessible via API from within the guest operating system. In operation, the guest operating system synchronously requests and receives one of the identities from the cloud operating system to perform an offline domain join (e.g., update the identity in place) before proceeding through the tail end of the bootup process (e.g., before the system launches the logon service).

The operations illustrated and described with reference to FIG. 5A, FIG. 5B, FIG. 5C, and FIG. 5D may be embodied as computer-executable instructions stored on one or more computer-readable media. The instructions, when executed by processor 306, configure an identity of a forked VM 235 based on a pool of available domain identities.

The forking and state customization operations illustrated and described with reference to FIG. 5A, FIG. 5B, FIG. 5C, and FIG. 5D may be implemented using templates and API 404 to configure and deploy the child VM in response to a request from cloud service 302. In an example of such embodiments, computing device 304 creates and maintains a hierarchy of parent VM templates 310 and the child VMs, in some embodiments. For example, computing device 304 maintains a set of powered-on parent VM templates 310 and a set of powered-off child VMs 312. Parent VM templates 310 are created, in some embodiments, in response to a request from at least one of cloud services 302. Alternatively or in addition, parent VM templates 310 are created on demand by computing device 304 after detecting patterns in VM 235 provisioning requests from cloud services 302. Maintaining the set of parent VM templates 310 includes, for example, powering-on each of parent VM templates 310. Each child VM is instantiated from one of parent VM templates 310 in response to a request for the child VM. Maintaining the set of child VMs includes, for example, pre-registering each instantiated child VM to the cloud operating system (e.g., before being initiated or otherwise powered-on).

Alternatively or in addition, one or more of cloud services 302 may create and maintain one or more of parent VM templates 310.

Computing device 304 determines whether a request has been received, from one of cloud services 302, for at least one of the child VMs. The request includes a desired child VM configuration, such as child VM properties and/or child VM identity data. The child VM configuration includes, but is not limited to, values describing the properties and/or characteristics of the requested child VM.

Upon receiving a request for one of the child VMs, computing device 304 determines whether parent VM template 310 exists for the requested child VM. For example, computing device 304 traverses a tree hierarchy of parent VM templates 310 searching for parent VM template 310 associated with the requested child VM. If parent VM template 310 associated with the requested child VM exists in the set of parent VM templates 310, computing device 304 selects one of the child VMs already instantiated from parent VM template 310. If no parent VM template 310 associated with the requested child VM exists (e.g., the request is for parent VM template 310 that is not in the hierarchy), computing device 304 dynamically creates a new parent VM template, or otherwise in response to the received request. Computing device 304 then instantiates the child VM from the newly-created parent VM template 310.

Computing device 304 applies the child VM configuration received via the received request to either the selected child VM or the newly-instantiated child, depending on whether parent VM template 310 associated with the requested child VM exists. Applying the child VM configuration includes, but is not limited to, customizing the selected child VM based on the child VM configuration so that the selected child VM has the child VM properties specified in the child VM configuration. For example, applying the child VM configuration includes applying child VM identity data to the selected child VM.

Computing device 304 deploys the configured child VM. For example, computing device 304 initiates or otherwise powers-on the configured child VM. In embodiments in which child VM was pre-registered to the cloud operating system, deploying the configured child VM occurs without registering, in response to the received request, the child VM with the cloud operating system.

Computing device 304 optionally notifies requesting cloud service 302 of the deployment and availability of the configured child VM to accept processing.

In some embodiments, the request to add the child VM actually includes a request to add a plurality of the child VMs. In such embodiments, some of the operations may be performed for each of the plurality of the child VMs.

After deployment of the configured child VM, cloud service 302 may send commands to destroy the configured child VM. For example, as demand scales back, cloud service 302 sends commands to reduce the quantity of deployed VMs 235. As demand subsequently increase, cloud service 302 may send commands to again increase the quantity of deployed VMs 235. In such embodiments, compute fabric cloud service 402 receives a request from cloud service 302 to re-create the destroyed child VM. Compute fabric cloud service 402 re-performs the operations illustrated in FIG. 5 to detect the request, re-configure the child VM, and re-deploy the child VM.

Figure 6:
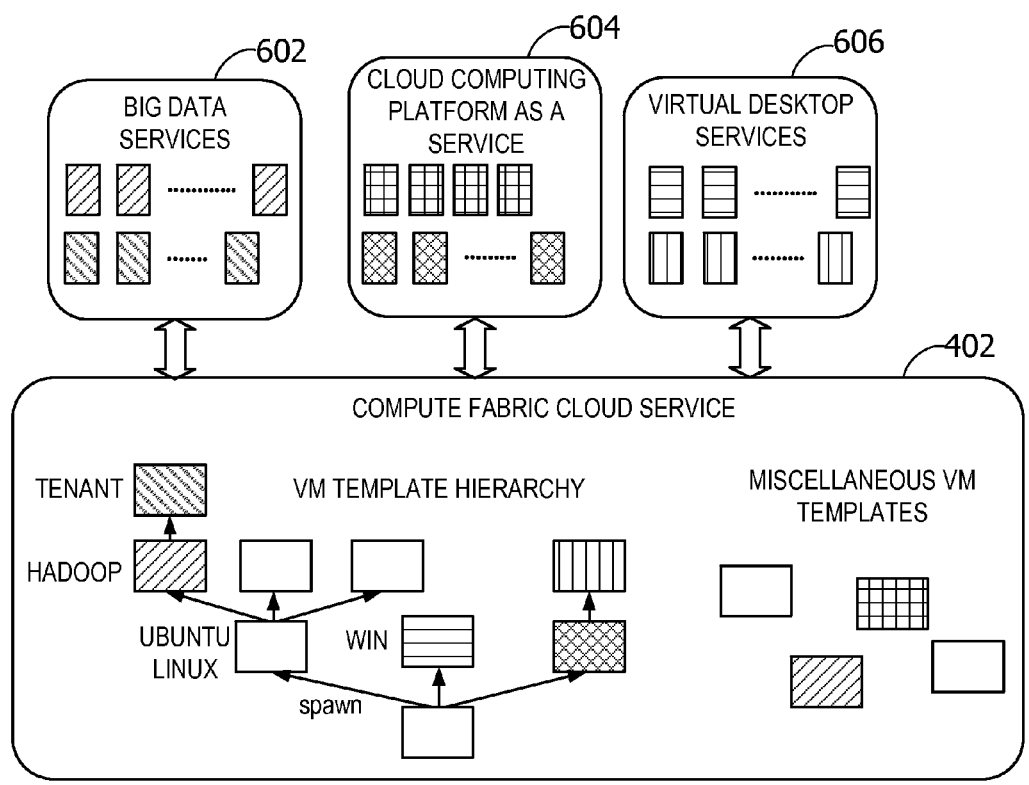
FIG. 6 is a block diagram of an exemplary compute fabric cloud service storing a hierarchy of parent VM templates.

Referring next to FIG. 6, a block diagram illustrates compute fabric cloud service 402 storing a hierarchy of parent VM templates 310. While illustrated with reference to particular cloud services 302, aspects of the disclosure are operable with any cloud service 302. In the example of FIG. 6, cloud services 302 include big data services 602 (e.g., data mining), cloud computing platform as a service (PaaS) 604 (e.g., CLOUD FOUNDRY brand software), and virtual desktop services 606 (e.g., virtual desktop infrastructure). Cloud services 302 communicate with, and share, compute fabric cloud service 402. Communication occurs via API 404 (as shown in FIG. 4) to quickly instantiate and destroy VMs 235 on demand.

Compute fabric cloud service 402 stores, in the example of FIG. 6, parent VM templates 310 in a tree hierarchy. As described with reference to FIG. 5, in response to receiving a request from cloud service 302 for one or more VMs 235 of a particular parent type, compute fabric cloud service 402 immediately customizes the child VMs with the requested identities (e.g., hostname, IP address, etc.) and provides the customized child VMs to requesting cloud service 302.

Both derived VM templates and standalone VM templates are illustrated in FIG. 6. Each derived VM template is derived from one of parent VM templates 310 and shares common disk blocks and memory pages with parent VM template 310. The standalone VM templates may be used when there is limited sharing. The request from cloud service 302 specifies the type of parent VM template 310 to use. For example, big data services 602 may use templates Hadoop and Tenant for instantiating its VMs 235. In this example, the Tenant VM template is spawned from the Hadoop VM template, such as with tenant-specific customizations. In another example, virtual desktop services 606 may use two derived VM templates from the tree hierarchy. In still another example, cloud computing PaaS 604 may use both a standalone VM template and a derived VM template from the tree hierarchy. While disk reads may be slower in children if many accesses are to a parent or older ancestor, cloud computing PaaS 604 may mitigate the effect of such slow reads by keeping only heavily shared packages in parent VM template 310, allowing only a few levels in the template hierarchy, and/or using standalone VM templates.

Figure 7:
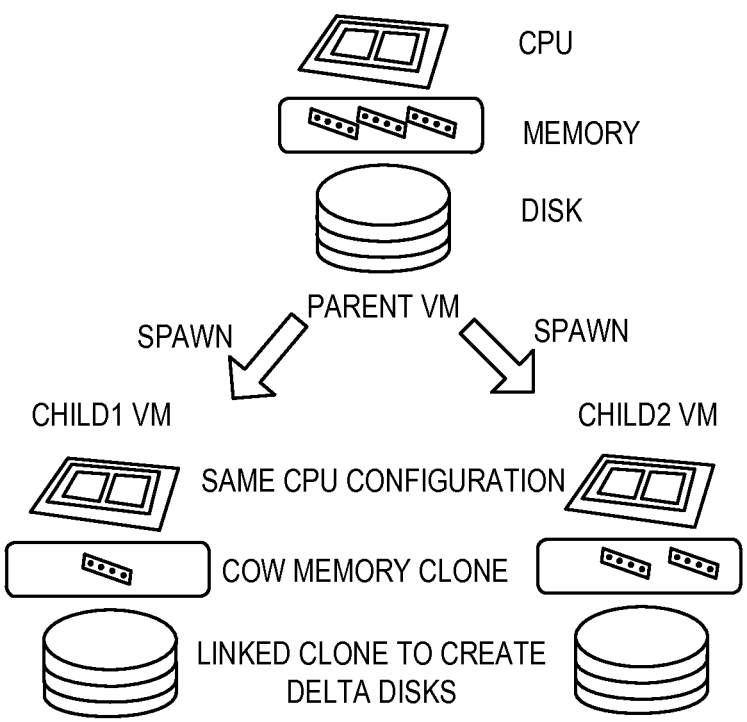
FIG. 7 is a block diagram illustrating instantiation of child VMs from a parent VM.

Referring next to FIG. 7, a block diagram illustrates instantiation of the child VMs (e.g., child1 VM and child2 VM) from parent VM template 310. As described herein, the child VMs may be instantiated in accordance with any fast instantiation routines. In some embodiments, instantiation occurs via routines that fork from VM 235. Through forking, compute fabric cloud service 402 avoids boot storm by instead consuming resources to power-on a base VM image once and then instantly forking off copies of the pre-booted VM. In this manner, compute fabric cloud service 402 eliminates the need for hot-spare VMs 235, or otherwise operates without any hot spares, in some embodiments. Further, forked VMs 235 share common memory and disk state, thus eliminating the need to store or de-duplicate redundant copies of disk or memory content across common VMs 235.

In an exemplary forking routine, one of VMs 235 is quiesced (thus becoming powered-on parent VM template 310), and then a defined quantity of the child VMs may be created using the memory, disk, and device state image of this parent VM template 310. Such a forking routine may be organized into three stages: preparing a parent VM, preparing the child VM, and spawning the child VM.

To prepare a parent VM (e.g., a target VM), the parent VM is first powered-on and brought into a state from which the child VMs are desired to begin execution. For example, preparing includes bringing down network interfaces in the parent VM in preparation for an in-guest identity change. When the parent VM is ready to be forked, user 108 or script issues a command via a guest RPC to hypervisor 210 requesting the forking. The fork request, in some embodiments, is a synchronous RPC that returns only after the fork process has succeeded. Hypervisor 210 handles the guest RPC by quiescing the parent VM, halting its execution state, and marking all of the memory pages in the parent VM as copy-on-write (COW). The memory and disk state of the parent VM are then ready for use by the child VMs. From the perspective of the parent VM, upon issuing the guest RPC, the parent VM is quiesced forevermore, never to run another instruction.

To prepare the child VM, the child VM is configured to leverage the existing memory, device, and disk state of the parent VM. To share the disk of the parent VM, the child VM is configured with a redo log pointing to the disk of the parent VM as the base disk of the child VM (e.g., similar to a linked clone VM). In addition, the child VM may be configured with its own dedicated storage that is not related to the parent VM. For example, the dedicated storage may include a data disk or access to shared storage if the child VM desires to persist state in storage other than its redo log.

A configuration file (e.g., .vmx file) associated with the child VM is updated to indicate that the child VM inherits the memory and device state of the parent VM upon power-on. The configuration file may also be updated with additional information, such as a desired MAC address and IP address for the child VM. The configuration file is registered with the cloud operating system (e.g., executing on a host), and the child VM is ready to be powered-on on demand.

In some embodiments, the redo log of the child VM is marked as non-persistent. In such embodiments, upon each power-on, the child VM inherits a fresh copy of the memory, device, and disk state of the parent VM (e.g., re-forks from the quiesced image of the parent VM). In other embodiments, the redo log of the child VM is marked as persistent.

Figure 8:
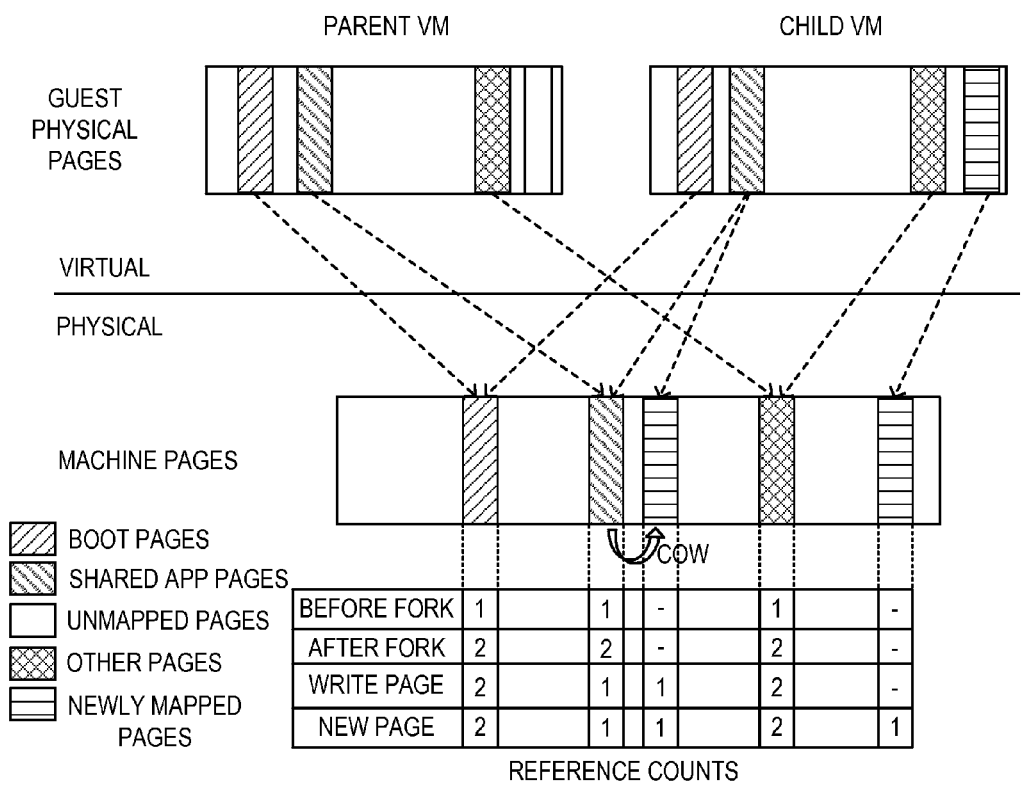
FIG. 8 is a block diagram illustrating shared memory between a parent VM and a child VM.

After preparation, the child VM is ready to be powered-on (e.g., spawned) upon receipt of a power-on request (e.g., from cloud service 302 or from compute fabric cloud service 402). In response to receipt of such a power-on request, the child VM inherits the memory and device state of parent VM template 310. As such, rather than performing a normal boot process, such as through the basic input output system (BIOS), the child VM instead resumes from the state of parent VM template 310. For example, the child VM inherits a COW reference to the memory state of parent VM template 310, such as shown in FIG. 8. Referencing COW memory on the same host eliminates overhead for unmapped pages and results in a small overhead for mapped pages (e.g., less than one microsecond for four kilobyte pages), thus providing fast child VM instantiation. FIG. 8 also illustrates the reference counts for each of the example pages shown in the figure before and after forking, when writing a page, and when creating a new page.

Further, by referencing COW memory, the child VM is able to begin execution in a fraction of a second from the precise instruction (e.g., fork guest RPC) at which parent VM (from which parent VM template 310 was created) was quiesced. From the perspective of the child VM, the child VM sees the fork guest RPC returning successfully from hypervisor 210. The child VM may then be migrated away from parent VM template 310 without need for one-to-many migrations (e.g., one-to-many vMotion operations).

Compute fabric cloud service 402 handles return of the fork guest RPC by customizing the child VM. Customizing the child VM includes, for example, reading and applying a desired configuration state from the configuration file specified when preparing the child VM. As described herein, some embodiments customize the child VM by identifying and applying a MAC address, IP address, hostname, and other state to the child VM. Leveraging the customization data, the child VM may then spoof its MAC address to the desired MAC address, update its hostname, IP address, etc., and bring up its network interface. The child VM then continues execution as a unique VM (e.g., separate from parent VM) with its own identity.

ADDITIONAL EXAMPLES

The following scenarios are merely exemplary and not intended to be limiting in any way.

In an example scenario involving big data services 602, many VMs 235 process different segments of data in parallel. Because these workloads execute along with other potentially time-critical workloads, to make efficient use of resources, the active quantity of VMs 235 must be expanded and reduced, quickly, over time and on demand. Because the creation of VMs 235 is expensive (e.g., in both latency and processor overhead), some existing systems power-on many VMs 235 in the background as hot spares, which wastes processor and memory resources. In contrast, aspects of the disclosure enable compute VMs 235 to be instantly provisioned for maximum performance and constantly recycled for better multi-tenancy. For example, to support Hadoop, 10s to 100s of compute VMs 235 are created to execute Map and Reduce tasks in parallel on data in the Hadoop file system. When Hadoop operates in scavenger mode, additional compute VMs 235 are created to run Hadoop jobs (e.g., low priority, batch jobs) as resources become available. By instantly provisioning and destroying the Hadoop compute VMs 235, embodiments of the disclosure reduce the need to have hot spares and significantly improve Hadoop performance.

In an example scenario involving virtual desktop services 606, users 108 login remotely to VMs 235 on a shared infrastructure and use those machines for day-to-day office work. The users 108 may have either a persistent VM, which is generally suspended to disk upon user session termination, or a non-persistent VM, where the user 108 is given a fresh VM for each new session. Virtual desktop services 606 greatly benefits from compute fabric cloud service 402 by leveraging the ability to store VM images as parent VM templates 310.

In this scenario, upon a user login request for a non-persistent VM, the child VM is forked, as described herein, from an appropriate parent VM template 310 thus allowing the login to be serviced immediately from an instantaneously provisioned child VM. Compute fabric cloud service 402 may also be able to assist in the persistent VM scenario where a delta of a session of the user 108 may be persisted as a set of changes (e.g., registry key deltas, user directory changes, etc.) that may be applied to a fresh child VM after forking from parent VM template 310 (e.g., just riot to allowing the user 108 to log in). In both the persistent VM and non-persistent VM examples, the automatic memory sharing between parent VM templates 310 and forked child VMs as described herein is beneficial.

In an example scenario involving cloud computing PaaS 604 or other cloud service provider, a large quantity of hot spares are required, with some existing systems, to support Postgres service VMs, MySQL service VMs, and the like. Not only do the hot spares waste resources and add greatly to the cost of the cloud service provider infrastructure, the hot spares are difficult to manage at least because the size of the hot spare pool for each service must be tuned based on workload demand prediction.

In contrast, with compute fabric cloud service 402, the VMs common to the services become parent VM templates 310 with instances forked off dynamically as child VMs ready to instantly handle work as needed. Compute fabric cloud service 402 automatically shares the underlying common memory pages and completely eliminates the need for spare VM pools, thus saving administrators from having to attempt prediction of workload demand. Compute fabric cloud service 402 reduces the need to maintain hot spares, enables fast upgrades by patching just parent VM templates 310 and instantly forking, and enables the same framework for provisioning VMs in different operating systems.

Example Implementation of Forking with Identity Configuration

Aspects of the disclosure are operable with any type, kind, form, or model of guest operating system to be executed by the parent VM and the child VMs. For the child VMs with guest operating systems, such as the WINDOWS brand operating system, that require a reboot to apply identity settings, some embodiments operate to apply a set of identities without requiring a reboot. An example set of identities includes computer name, domain machine account with domain join, license client machine identification with a key management service (KMS) volume license activation, MAC address, and IP address. To eliminate the reboot, these exemplary embodiments contemplate execution of two components within a guest agent residing inside the parent VM. One component is a native application while the other component is a service (e.g., a post-fork identity service). The native application is executed at the beginning of session manager initialization, which occurs after a boot loader phase and a kernel initialization phase of the bootup process. The post-fork identity service is a system service launched by a service control manager, and configured such that other services (e.g., a Netlogon service, a software protection platform service, and a TCP/IP protocol driver service) are dependent on this service, as further described below.

The native application executes, as the parent VM is powered on and boots up, to issue the fork command. The fork command quiesces the parent VM into a ready-to-fork state. By setting the forking point of the parent VM at the beginning of session manager initialization, the computer name may be set before subsystems and any system services of the guest operating system refer to the computer name. By preventing the subsystems and system services from referring to the computer name, conflicts are avoided thus eliminating any potential reboot threat. Then, as each child VM is forked during the fork process, the native application continues its execution inside the guest operating system of each child VM.

As the native application resumes execution inside each child VM, the set of identities is applied to each child VM. In an example involving one child VM, the native application applies the computer name change to directly set the new name to a full list of registry entries, or other configuration entries.

In another example, a domain machine account with domain join is achieved in two phases. The first phase may be performed by any application (e.g., external to the child VM) before each child VM is forked. The first phase includes pre-creating a machine account for each forked child VM against a directory service of the target domain. The application passes the machine password of the pre-created machine account to each child VM as an identity value. The second phase occurs after forking the child VM (e.g., during a post-fork stage) and is executed by a post-fork identity service associated with a guest agent inside the guest operating system of each child VM. The post-fork identity service retrieves the pre-specified machine password and directly inserts it into the machine private data store. After this, the machine password stored inside the guest operating system of each child VM now matches the corresponding computer account password stored in the directory service of the target domain, thus completing the domain join.

Aspects of the disclosure configure authentication services (e.g., Netlogon) in the child VM to not start until after the domain join has been completed, to prevent attempts to authenticate the guest computer and/or users 108 against the target domain. In this way, the authentication services depend on the post-fork identity service.

A license client machine identifier, with KMS volume license activation in some embodiments, is also obtained by the post-fork identity service. First, the cached content files that store the existing license activation status and the client machine identifier copied from the parent VM are removed. After the post-fork identity service completes its startup, a KMS volume license activation command is issued to activate the volume license and generate a new license client machine identifier.

Aspects of the disclosure configure software validation/activation services (e.g., Software Protection Platform) in the child VM to not start until after the license client machine identifier has been generated, to prevent attempts to validate software associated with the child VM. In this way, the software validation/activation services depend on the post-fork identity service.

The MAC address setting is also performed by the post-fork identity service. To set a new MAC address for a network adapter associated with the child VM, the post-fork identity service directly sets the MAC address through its network address property, and then disables and re-enables the network adapter. Aspects of the disclosure configure communication services (e.g., a TCP/IP service) in the child VM to not start until after the new MAC address has been set, to prevent potential conflicts (e.g., a TCP/IP conflict). In this way, the communication services depend on the post-fork identity service.

The IP address setting depends on whether the configuration uses dynamic host configuration protocol (DHCP) or a static IP. For DHCP configuration, the forking point is placed before the DHCP client service is launched, so no additional work is performed by the guest agent during the post-fork stage to configure the IP address. Once each child VM is forked, the DHCP client service starts and obtains an IP address from the DHCP server automatically.

In a static IP configuration, the post-fork identity service sets the IP address of a network adapter, and then disables and re-enables the network adapter. Aspects of the disclosure configure communication services (e.g., a TCP/IP service) in the child VM to not start until after the new IP address has been set, to prevent potential conflicts (e.g., a TCP/IP conflict). In this way, the communication services depend on the post-fork identity service.

Exemplary Operating Environment

The operations described herein may be performed by a computer, such as computing device 304. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for creating forked VMs 235. For example, the means include means for defining, by a computing device 304 based on a virtual device state 318 of a suspended first VM 235, a virtual device state of a second VM 235, means for defining persistent storage for the second VM 235 based on persistent storage of the suspended first VM 235, and means for configuring, by computing device 304, an identity of the second VM 235 based on configuration data 313 associated with the second VM 235.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of".

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for creating customized, forked virtual machines (VMs) with identity-based differentiation of services, said system comprising:
    memory associated with a computing device, said memory storing a virtual device state and a memory state of a parent virtual machine (VM);
    storage for the parent VM, said storage further including configuration data for at least one child VM, said storage further identifying identity-independent services and identity-dependent services, wherein the identity-independent services are unrelated to an identity of the child VM and the identity-dependent services are associated with the identity of the child VM; and
    a processor programmed to:
        initiate execution of the identity-independent services in the parent VM;
        instantiate the child VM from the parent VM, wherein the child VM shares memory and storage with the parent VM;
        configure the identity of the child VM based on the configuration data associated with the child VM; and
        initiate execution of the identity-dependent services in the child VM after configuring the identity of the child VM, wherein execution of the identity-dependent services occurs without prompting a reboot of the child VM.

2. The system of claim 1, wherein the storage further includes a plurality of domain identities, and wherein configuring the identity of the child VM comprises:
    selecting one of the plurality of domain identities from the storage; and
    applying, before the child VM completes a boot process, the selected one of the plurality of domain identities to the child VM.

3. The system of claim 1, wherein the processor is programmed to instantiate the child VM from the parent VM by:
    tagging the storage of the parent VM as copy-on-write (COW); and
    tagging the memory state of the parent VM as COW.

4. The system of claim 3, wherein the processor is programmed to suspend execution of the parent VM, tag the storage as COW, and tag the memory state as COW in response to a request from at least one of a user or a management level application.

5. The system of claim 3, wherein the memory state of the parent VM is read-only, and wherein the processor is further programmed to store changes, made by the child VM to the read-only memory state of the parent VM, as delta memory.

6. The system of claim 1, wherein the configuration data comprises at least one of an Internet Protocol (IP) address, a media access control (MAC) address, a hostname, or a domain identity.

7. A method for reboot-free identity customization of instantiated virtual machines (VMs), the method comprising:
    initiating, by a computing device, execution of a first group of services, in a first VM, the first group of services being unrelated to an identity of a second VM;
    instantiating the second VM from the first VM, wherein the second VM shares memory and storage with the first VM;
    configuring, by the computing device, the identity of the second VM based on configuration data associated with the second VM; and
    initiating execution of a second group of services, which are associated with the configured identity of the second VM, in the second VM after configuring the identity of the second VM, wherein execution of the second group of services occurs without prompting a reboot of the second VM.

8. The method of claim 7, wherein configuring the identity of the second VM comprises applying one of a plurality of pre-configured domain identities to the second VM before the second VM completes a boot process.

9. The method of claim 7, wherein the first group of services is identity-independent and the second group of services is identity dependent.

10. The method of claim 7, further comprising receiving, from a service provider, identification of the first group of services and identification of the second group of services.

11. The method of claim 7, wherein instantiating a second VM from the first VM comprises:
    suspending the first VM;
    defining, based on a virtual device state of the suspended first VM, a virtual device state of the second VM;
    defining, based on a memory state of the suspended first VM, a memory state of the second VM; and
    defining persistent storage for the second VM based on persistent storage of the suspended first VM.

12. The method of claim 11, wherein defining the virtual device state of the second VM comprises copying the virtual device state of the suspended first VM.

13. The method of claim 11, wherein defining the persistent storage for the second VM comprises using array-level disk snapshots of the suspended first VM.

14. The method of claim 11, wherein defining the memory state of the second VM comprises creating copy-on-write (COW) sharing of the memory state of the suspended first VM.

15. The method of claim 7, wherein configuring the identity of the second VM comprises executing the second VM, the second VM customizing itself during bootup.

16. The method of claim 7, further comprising accessing the configuration data associated with the second VM, the configuration data being registered with virtualization software executing on the computing device.

17. One or more computer-readable storage media including computer-executable instructions that, when executed, cause at least one processor to configure an identity of a forked virtual machine (VM) based on a pool of available domain identities, by:
    initiating, by a computing device, execution of a first group of services in a first VM, the first group of services being unrelated to an identity of a second VM;
    instantiating the second VM from the first VM, wherein the second VM shares memory and storage with the first VM;
    configuring the identity of the second VM based on configuration data associated with the second VM by:
        obtaining, by the second VM, one of a plurality of domain identities available to the second VM, and
        applying the obtained one of the plurality of domain identities to the second VM; and
    initiating execution of a second group of services, said second group of services being associated with the configured identity of the second VM, in the second VM after configuring the identity of the second VM, wherein execution of the second group of services occurs without prompting a reboot of the second VM.

18. The computer storage media of claim 17, wherein the computer-executable instructions cause the processor to configure the identity of the second VM by configuring a boot process of the second VM, the second VM performing the boot process to configure the identity of the second VM.

19. The computer storage media of claim 17, wherein the computer-executable instructions further cause the processor to create the plurality of domain identities prior to defining the virtual device state of the second VM and prior to defining the persistent storage for the second VM.

20. The computer storage media of claim 17, wherein the computer-executable instructions further cause the processor block completion of bootup of the second VM until after the obtained one of the plurality of domain identities is applied to the second VM.

* * * * *